(No Model.) 2 Sheets—Sheet 1.
F. C. LUDLOW.
COMBINED MATCH SAFE AND CIGAR CUTTER.
No. 534,899. Patented Feb. 26, 1895.
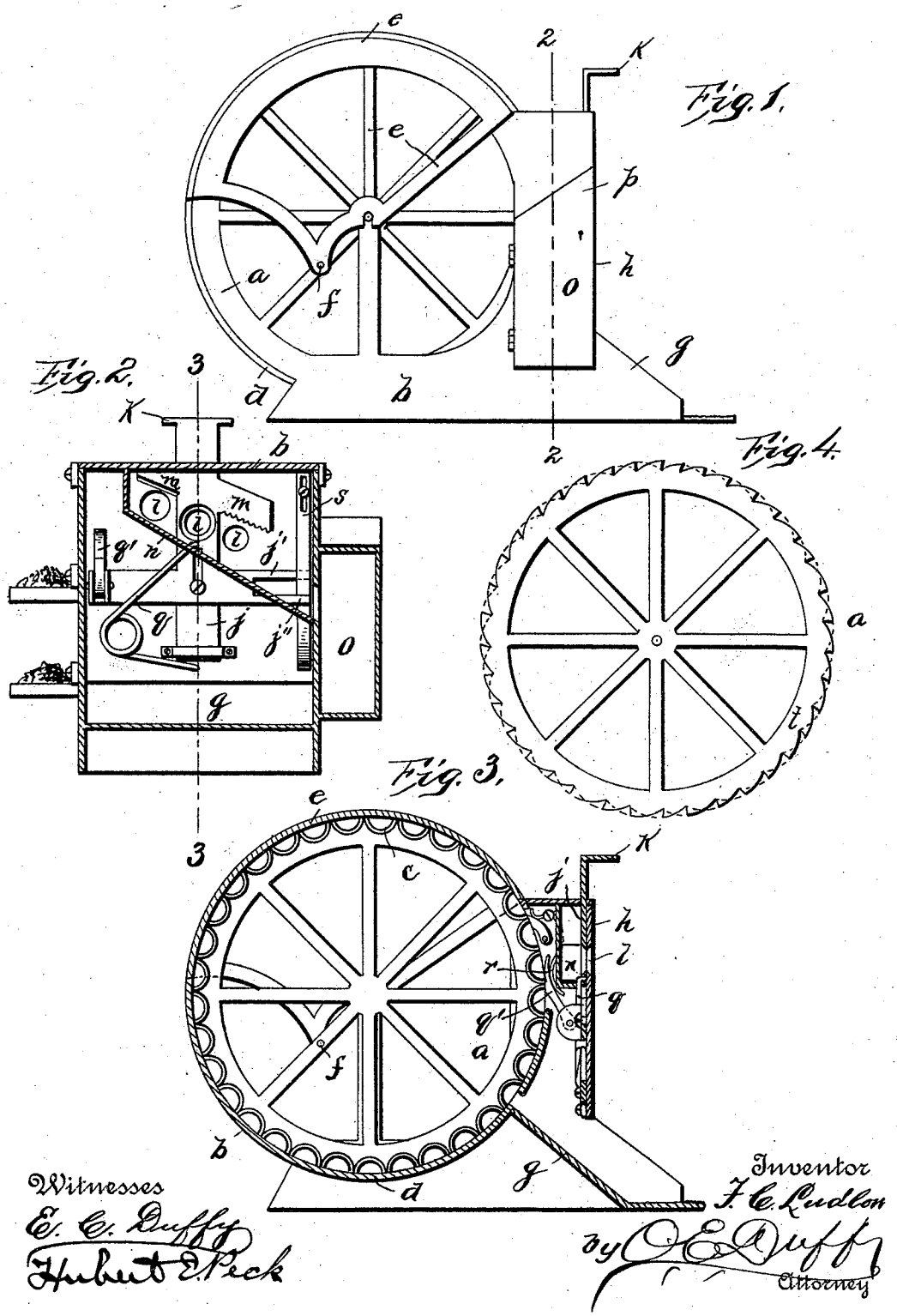

(No Model.) 2 Sheets—Sheet 2.

F. C. LUDLOW.
COMBINED MATCH SAFE AND CIGAR CUTTER.

No. 534,899. Patented Feb. 26, 1895.

Witnesses
E. C. Duffy
Hubert E. Peck

Inventor
F. C. Ludlow
by O. E. Duffy
Attorney

UNITED STATES PATENT OFFICE.

FREEMAN C. LUDLOW, OF CINCINNATI, OHIO.

COMBINED MATCH-SAFE AND CIGAR-CUTTER.

SPECIFICATION forming part of Letters Patent No. 534,899, dated February 26, 1895.

Application filed July 11, 1894. Serial No. 517,201. (No model.)

*To all whom it may concern:*

Be it known that I, FREEMAN C. LUDLOW, of Cincinnati, in the county of Hamilton and State of Ohio, have invented certain new and useful Improvements in a Combined Match-Safe and Cigar-Cutter; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in combined cigar cutters and match safes.

The object of the invention is to provide an automatic match delivering device provided with a cigar cutter and controlled and actuated by the cigar cutter so that when the cutter has been operated the said match containing device will be operated to deliver a match to the smoker.

A further object of the invention is to provide an automatic match containing and delivering device comprising a rotary drum containing compartments around its periphery and arranged to separately receive the matches, so that as the drum is rotated step by step, the matches will be discharged one by one from the casing closing the outer open sides of the compartments.

A further object of the invention is to provide certain improvements in details of construction and arrangements of parts, whereby a highly improved, simple, durable and efficient combined cigar cutter and match delivering device is produced.

The invention consists in certain novel features of construction and in combinations of parts more fully and particularly described hereinafter and pointed out in the claims.

Referring to the accompanying drawings:—

Figure 5:
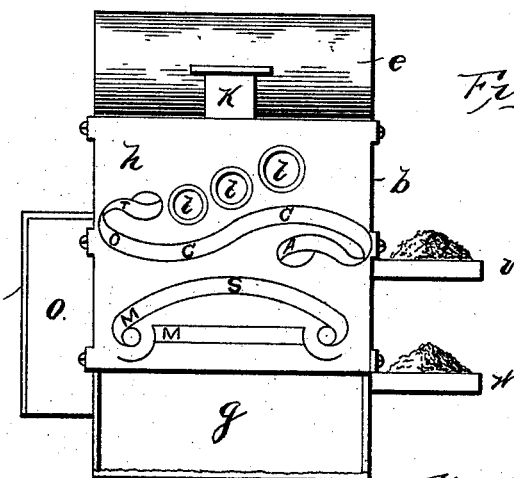
Figures 6, 7, 8:
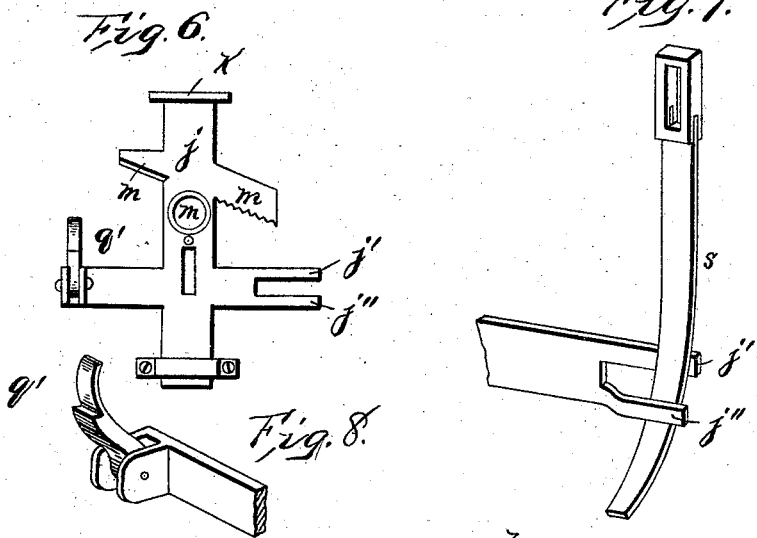
Figure 9:
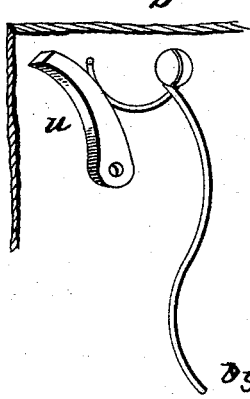

Figure 1, is a side elevation of the improved article. Fig. 2, is a vertical sectional view on the line 2—2, Fig. 1. Fig. 3, is a vertical sectional view on the line 3—3, Fig. 2. Fig. 4, is a detail edge elevation of the ratchet of the match containing drum. Fig. 5, is a front elevation of the complete article. Fig. 6, is a detail elevation of the cigar cutting knives and the carrier therefor. Fig. 7, is a detail perspective view of the spring pawl normally holding the drum against forward rotation also showing a portion of the device for releasing said pawl from the drum when the drum is to be fed forward to deliver a match. Fig. 8, is a detail perspective view of the feed pawl and a portion of its carrier. Fig. 9, is a detail sectional view showing the pawl in elevation which prevents retrograde movement of the drum.

In the drawings, $a$, is a horizontally arranged drum having end journals mounted in suitable bearings in the supporting frame $b$. This drum can be of any diameter and length desirable and its periphery is composed of a plurality of closely arranged longitudinal parallel match holding grooves, depressions or receptacles $c$, each match receptacle being of a length, width and depth to receive easily one match and the receptacles are open at their outer faces.

The periphery of the drum is inclosed by the circular wall or casing $d$, snugly fitting the outer edges of the match receptacles so as to close the same and retain the matches. This casing is carried by the support $b$, and is of a length equal to the length of the drum $a$. The upper portion of the casing can be carried by the swinging lid $e$, pivoted at $f$, to the supporting frame, whereby the upper portion of said surrounding casing can be swung from the drum and thereby expose the upper portion of the drum so that the various receptacles can be filled with matches.

The casing extends around beneath the drum and up at the front a short distance above the lowest portion of the drum where the casing terminates in a forwardly and downwardly extending chute $g$, ending in a pan or flat portion. Thus when the drum rotates rearwardly and upwardly the matches are dropped from the receptacle as they pass to the lower side of the horizontal diameter of the drum on to the casing along which they are swept by the drum until they reach the chute $g$, down which the matches are dropped one by one as required.

At the front sides of the article above the chute $g$, the casing is formed with a vertical front wall or plate $h$, arranged a short distance from the periphery of the drum. Within the compartment, thus formed between the front of the drum and said wall, the cigar cutting and drum controlling mechanism is arranged. Referring to this cutting and controlling means; j, indicates a vertically moving slide bar arranged at the inner face of the front plate h, and confined in suitable guides to reciprocate vertically. This bar is provided with a handle or push piece k, extending through the top of the casing and a distance above the same. This vertically movable bar carries the cigar cutting knives, arranged behind and above the openings l, through the front plate for the insertion of the cigar tip. The knives m, project laterally from the bar so as to move over the openings in the front plate with a shearing action as the bar is depressed. These knives can be variously formed to cut the tips different ways according to the taste of the smoker. The bar itself can also be provided with the central opening having an upper knife edge and arranged to register with one of the openings in the front plate so as to cut the cigar tip. Beneath the said cutting knives and edges, the front plate of the casing is provided, on its rear side, with a transverse chute n, inclined downwardly, and opening through the side of the casing into a receptacle o, formed on the side of the casing, and provided with a hinged door p, having a suitable lock. Thus the tips cut from the cigars fall in this chute and are carried into the said closed chamber or receptacle from which they can be removed when desired. q, is a stiff spring secured in the front portion of the casing and attached to said sliding bar and exerting constant pressure thereon to move the bar upwardly to its limit of upward movement. This spring constitutes the feeding spring for the drum, as will be more fully hereinafter explained.

The lower portion of the slide bar is provided with a lateral arm in which the feed pawl $q'$, is journaled. This pawl extends upwardly and is provided with an upwardly facing shoulder. The pawl rests against the periphery of the drum and is held yieldingly pressed against the same by means of the spring r. The pawl is so formed, that when the push bar is forced down, the pawl runs loosely over the outer edges of the match receptacle, and when the push bar is released and forced upwardly by its spring the said feed pawl engages the edge of the match receptacle and rotates the feed drum forwardly a distance equal to the width of the match receptacle, thereby delivering one match into the chute $g$,.

s, is a pawl composed of a curved plate spring secured in the front portion of the casing at its outer end with its lower end curved inwardly toward the drum and arranged to engage the teeth of the ratchet wheel t, on one end of the drum. Each tooth of this ratchet wheel is equal to the width of the match receptacle so that the number of teeth equal the number of match receptacles. These teeth are inclined in the opposite direction to the feeding movement of the drum and the said spring normally prevents feeding rotation of the drum. The reciprocating bar is provided with means to release this spring from the ratchet wheel and permit forward feeding of the drum a distance equal to one tooth. These means can consist of a lateral arm from the push bar having a forked end, one leg $g'$, of the fork passed behind the said spring and the other leg $j''$, bent outwardly so as to pass on opposite side of the spring, this pawl releasing device being so formed relatively to the spring that when the push bar is depressed its full stroke and said forked end will move down on the curved end of the spring and strain the same out and release its extremity from the ratchet wheel. When the push bar starts on its upward movement the spring is kept from the ratchet wheel until the feed pawl has rotated the drum the distance of one tooth when said spring is released and immediately engages the ratchet wheel and locks the drum so that it is impossible for the drum to rotate a distance greater than the width of one match receptacle. It should also be noticed that the curvature of this spring pawl exerts an upward tension on the cam device which releases it and thereby assists the feeding spring in forcing the push bar upward. It should be observed that this spring pawl is adjustably vertically so that it can be accurately adjusted for the purpose intended, whereby its function will be performed with accuracy and it can be set to a nicety.

u, indicates a pawl pivoted in the casing and provided with a suitable spring and engaging the ratchet wheel to prevent retrograde movement of the drum so that when the cigar cutter is in its resting position, the drum is locked against movement in either direction.

The casing on its side opposite the receptacle to receive the clippings can be provided with suitable trays v, for the spices, ornamentation or other purposes.

This device can be highly ornamented and if desired can be provided with advertising matter on the exterior of the case.

It should be observed that the device is exceedingly accurate in its movements and that there is no possibility of the matches becoming ignited by clogging or otherwise and the matches are separately contained throughout, which is a feature of great importance and advantage.

The proportions of the parts of the device can be greatly varied so that the drum can receive a greater or less number of matches.

Having thus fully described my invention, what I claim as new, and desire to secure by Letters Patent of the United States, is—

1. The combination of the casing comprising the front plate, a rotary match holding drum in said casing a vertically movable spring-actuated slide bar behind said plate in front of the drum and provided with a cutter, a feeding pawl carried by said bar to rotate the drum, said drum having a ratchet wheel, a pawl engaging said ratchet wheel to prevent rotation of the drum, said bar having an arm to throw the pawl from said ratchet wheel when the bar is forced down, substantially as described.

2. The combination of the casing having a front plate provided with openings for the cigar tips, a reciprocating bar behind said plate having cutters, the transverse chute behind said plate below the opening and the chamber at the exterior of the casing into which said chute discharges, said chamber having a door, substantially as described.

3. The rotary match holding drum, in combination with a reciprocating spring actuated frame provided with a feeding pawl, a spring having its end carried in toward the drum to hold the same, and an arm from said frame extended out over said spring so as to straighten the same out from the drum when the bar is forced down for the purpose set forth.

In testimony that I claim the foregoing as my own I affix my signature in presence of two witnesses.

FREEMAN C. LUDLOW.

Witnesses:
O. E. DUFFY,
C. M. WERLÉ.